INVENTORS
Spyridon P. Antippas
Ellery P. Snyder
BY
Leonard H. King
AGENT.

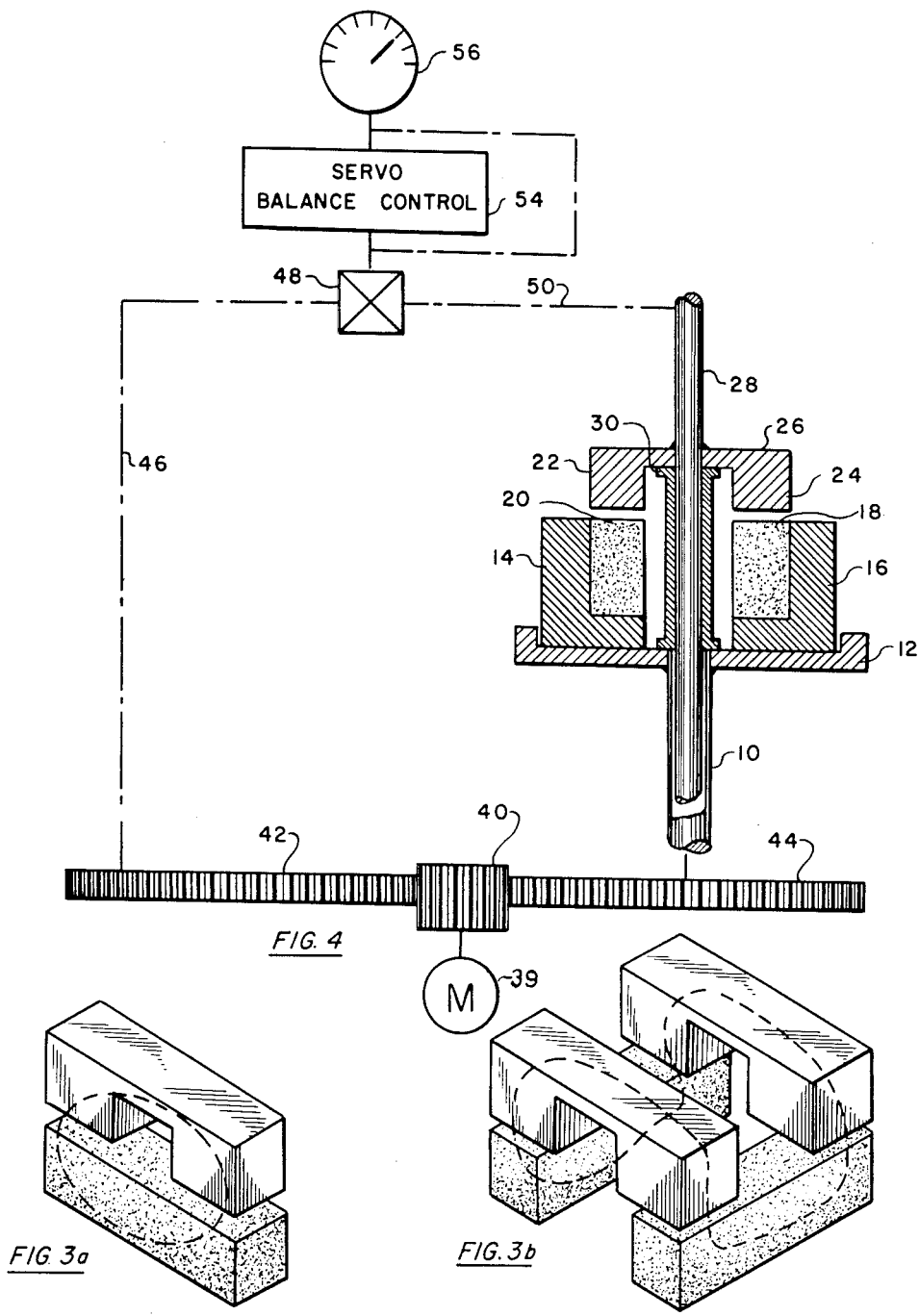

United States Patent Office 2,755,397
Patented July 17, 1956

2,755,397

VELOCITY RESPONSIVE CLUTCH MECHANISMS AND DEVICES UTILIZING SAME

Ellery P. Snyder and Spyridon P. Antippas, New York, N. Y., assignors to Aviation Engineering Division Avien-Knickerbocker, Inc., Woodside, N. Y.

Application December 21, 1953, Serial No. 399,277

4 Claims. (Cl. 310—95)

This invention relates to velocity responsive clutch mechanisms, and in particular, but not limited thereto, to a motor-driven servo control utilizing said clutch mechanisms.

In a typical application for the mechanism of this invention, a single servo type motor-driven indicator is used to indicate quantity of fuel in the various fuel storage tanks of an aircraft. If the pilot desires to know the quantity of fuel in a particular storage tank he operates a circuit selecting switch which renders a sensing element in the selected tank in operative relationship with the indicator. The indicator is conventionally coupled to a servo balancing unit which is usually a potentiometer. In order to minimize hunting of the servo balancing unit because of sloshing of the fuel in the tank, it is customary to provide a slow speed mechanism. If a wide disparity in the respective quantities of fuel exists, then it is necessary for the indicator to travel over a large distance which is time-consuming. In order to overcome this disadvantage, an improved gear train in conformance with this invention may be utlized wherein if a wide disparity exists, the driving motor operates at a high velocity causing a clutch to add the assistance of a high speed gear ratio to a normal speed gear train. The high speed train remains engaged until balance is approximately accomplished, at which point only the slower speed train is employed so that the overshooting and hunting of the unit is minimized. Thus, the best advantages of a slow speed device, without the attendant disadvantage, are obtained.

It is an object of this invention to provide a multispeed gear train.

It is another object of this invention to provide an improved velocity responsive clutch mechanism.

It is a still different object of this invention to provide a light weight and compact velocity responsive clutch mechanism.

An object of this invention is to extend the velocity range of a servo mechanism.

An object of this invention is to provide a variable velocity indicator.

Another object is to provide a variable velocity servo control device.

Other objects and advantages will become apparent from a consideration of the following description taken in conjunction with the accompanying drawings.

In the drawings:

Figure 3 shows the flux linkage path in the engaged position.

Figure 4 shows partially pictorially and partially schematically the clutch mechanism as part of a servo controlled indicator.

Figure 1:
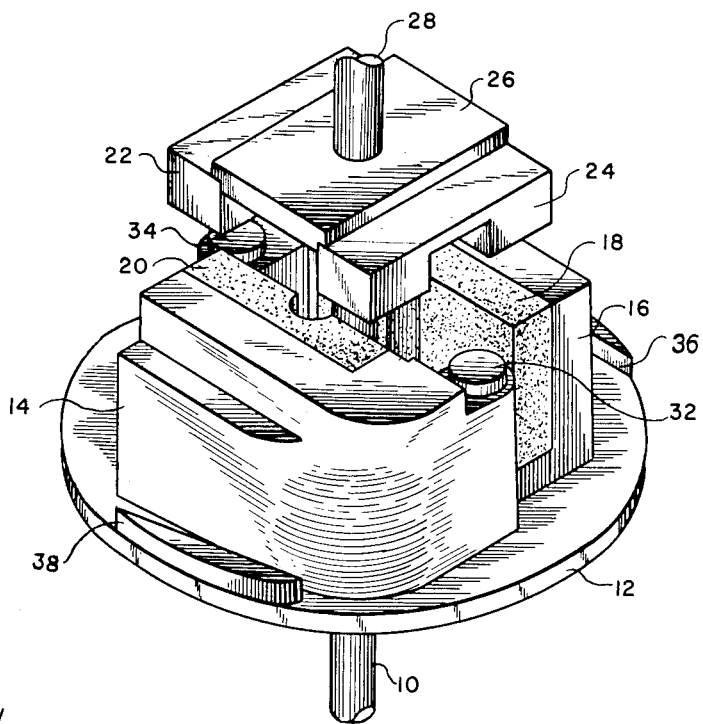
Figure 1 shows pictorially the clutch mechanism in the unengaged position.

Referring now to Figure 1 the device consists of a hollow drive shaft 10 arranged to drive a disc 12 upon which are positioned two arms 14 and 16 bearing magnets 18 and 20. Spaced from the arms, there is provided a pair of pole pieces 22 and 24 carried by a runner 26. Runner 26 is mounted on shaft 28, one end of which is inserted into hollow shaft 10 to provide radial alignment. Spacer 30, which may be seen in Figure 4, provides a predetermined axial displacement between the pole pieces and the magnetic elements 18 and 20.

Figure 2:
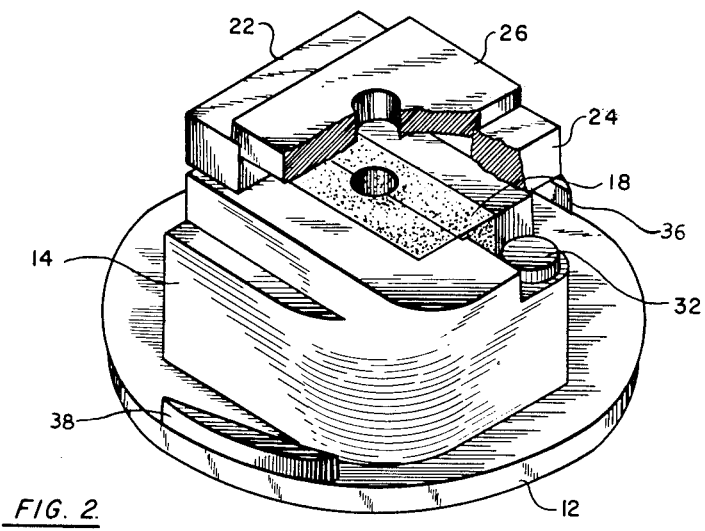
Figure 2 shows pictorially a partially cut-away view of the clutch mechanism in the engaged position.

In Figure 2 there is shown the magnets in the closed position. In this figure, the shaft is omitted for purposes of clarity. It is to be noted that in this position pole pieces 22 and 24 are not located in the field of the magnets.

The net torque on each of the magnetized arms 14 and 16 with respect to their pivot pins 32 and 34 is the vector sum of the torque due to the resultant magnetic force of attraction between the two arms, the resultant centrifugal force exerted on the center of gravity of each arm under rotational conditions, and the Coriolis force under conditions of rotation.

Under steady angular velocity the Coriolis force is equal to zero. If the angular velocity is large enough, the moment of the centrifugal forces with respect to pivots 32 and 34 is larger than that of the magnetic forces of attraction between arms 14 and 16. Hence, the spacing between the arms will increase until their motion is limited by stops 36 and 38. The stops may optionally be adjustable so that the maximum air gap between the magnets can be accurately controlled.

If the angular velocity of the drive shaft is low, the arms will attract each other and by proper design they will come in contact along a plane. Then, assuming the proper polarity, the exciting magneto-motive forces will be short circuited by the magnets. No flux, therefore, except a small leakage flux, will link the pole pieces on the runner.

When the angular velocity of the shaft is large enough, centrifugal forces will cause the arms to be pivoted outward. Since the magnets are no longer in contact, the magnetic short circuit will be removed. The design is such that under that condition of separation of the magnets, the pole pieces are positioned directly over the magnets. Depending on the random position of the pole pieces at the moment of separation of the magnets the pole pieces may be magnetically linked with the magnets through two small air gaps, that is to say, runner 26 is in such a position that pole piece 24 is directly above either magnet 18 or magnet 20 so as to provide a flux path as shown in Figure 3a. Alternately, the position of the pole piece at the instant the magnets separate may be such that the pole pieces are left astride the two arms as shown in Figure 3b. Under these conditions the flux of both of the magnets will link the pole pieces of the runner as shown in Figure 3b. In either case, the torque will now be transmitted to the shaft of the runner.

In Figure 4 there is shown a motor 39 driving gear 40 which in turn drives gears 42 and 44. Gear 42 operates gear train 46 which is connected to differential 48 whereas gear 44 drives shaft 10. When the angular velocity of shaft 10 is sufficient, the runner is engaged and the torque is transmitted to shaft 28 which, by means of a gear train 50 shown symbolically as dashed lines, is connected to differential 48. Thus, the output of differential 48 may be used to drive a servo control unit 54 and indicator 56.

In designing the unit, the strength of the magnets, the air gaps and arm mass may be controlled so that the centrifugal forces exerted on the arm and the magnetic forces are in proper relation to each other. Formulas for calculating these forces are well known and appear in standard reference texts on the subject.

The flux of the magnetized arms should be confined within the domain of the device, therefore, all shaft connections should be formed of non-magnetic materials.

While we have disclosed what we consider to be the best mode for carrying out this invention be it understood that many changes in the design of the embodiment as disclosed herein may be made without departing from the spirit of the invention. Accordingly, we wish to be limited only by the scope of the appended claims.

We claim as new:

1. A clutch mechanism comprising a hollow rotating shaft, a disc rotated by said shaft, a pair of arms pivoted on said disc so as to permit movement radially of said shaft, a pair of magnets carried by said arms, said magnets being characterized by a magnetic force sufficient to hold said pair together in the absence of a centrifugal force greater than said magnetic force, a pair of pole pieces axially spaced from said magnets and adapted to be in the field of said magnets only when said magnets are separated by said centrifugal force, and a driven shaft coupled to said pole pieces and having a portion extending into said hollow shaft and axially aligned thereto.

2. A clutch mechanism comprising, a rotating shaft, a pair of arms pivoted so as to permit movement radially of said shaft, a pair of magnets carried by said arms, said magnets being characterized by a magnetic force sufficient to hold said pair together in the absence of a centrifugal force greater than said magnetic force, a pair of pole pieces axially spaced from said magnets and adapted to be in the field of said magnets only when said magnets are separated by said centrifugal force, a driven shaft axially positioned with respect to said rotating shaft and coupled to said pole pieces.

3. A clutch mechanism comprising a hollow rotating shaft, a disc rotated by said shaft, a pair of arms pivoted on said disc so as to permit movement radially of said shaft, a pair of magnets carried by said arms, said magnets being shaped to fit around said shaft and characterized by a magnetic force sufficient to hold said pair together in the absence of a centrifugal force greater than said magnetic force, a pair of pole pieces axially spaced from said magnets and adapted to be in the field of said magnets only when said magnets are separated by said centrifugal force, a driven shaft coupled to said pole pieces and having a portion extending into said hollow shaft and axially aligned thereto, and stop members for limiting the radial movement of said arms.

4. A clutch mechanism comprising, a rotating shaft, a pair of arms pivoted so as to permit movement radially of said shaft, means to limit said movement, a pair of magnets carried by said arms and adapted to encircle said shaft, said magnets being characterized by a magnetic force sufficient to hold said pair together in the absence of a centrifugal force greater than said magnetic force, a pair of pole pieces adapted to be in the field of said magnets only when said magnets are separated by said centrifugal force, means to space said pole pieces from said magnets, and a driven shaft axially positioned with respect to said rotating shaft and coupled to said pole pieces.

References Cited in the file of this patent

UNITED STATES PATENTS

| | | |
|---|---|---|
| 1,887,284 | Brady | Nov. 8, 1932 |
| 2,215,294 | Morrill | Sept. 17, 1940 |
| 2,248,030 | Zwack | July 1, 1941 |
| 2,459,829 | Maxwell | Jan. 25, 1949 |
| 2,528,502 | De Florez et al. | Nov. 7, 1950 |
| 2,677,539 | Winslow | May 4, 1954 |